E. F. NORELIUS.
TRAILER WAGON.
APPLICATION FILED SEPT. 30, 1914.
1,317,653.
Patented Sept. 30, 1919.
2 SHEETS—SHEET 1.
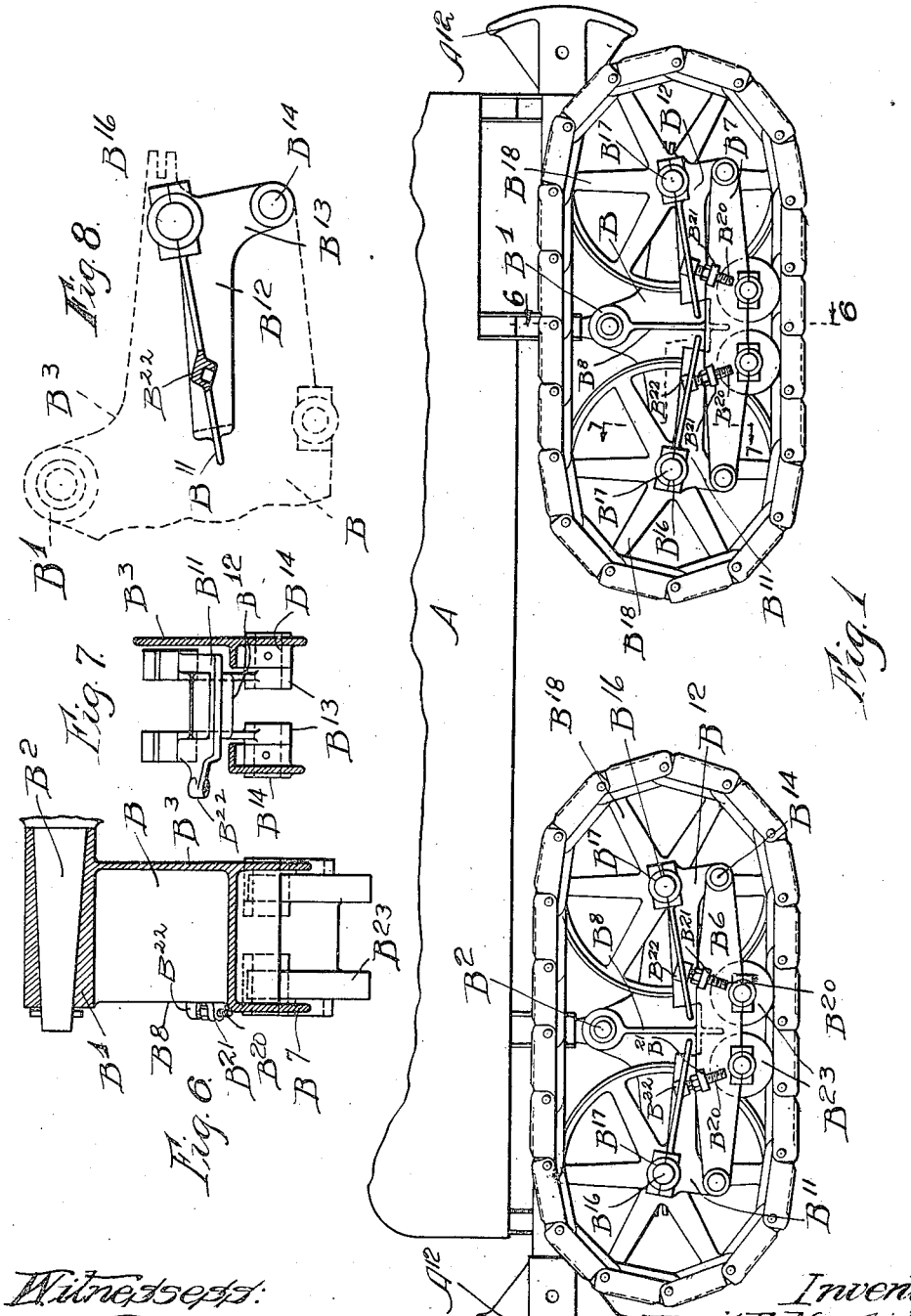

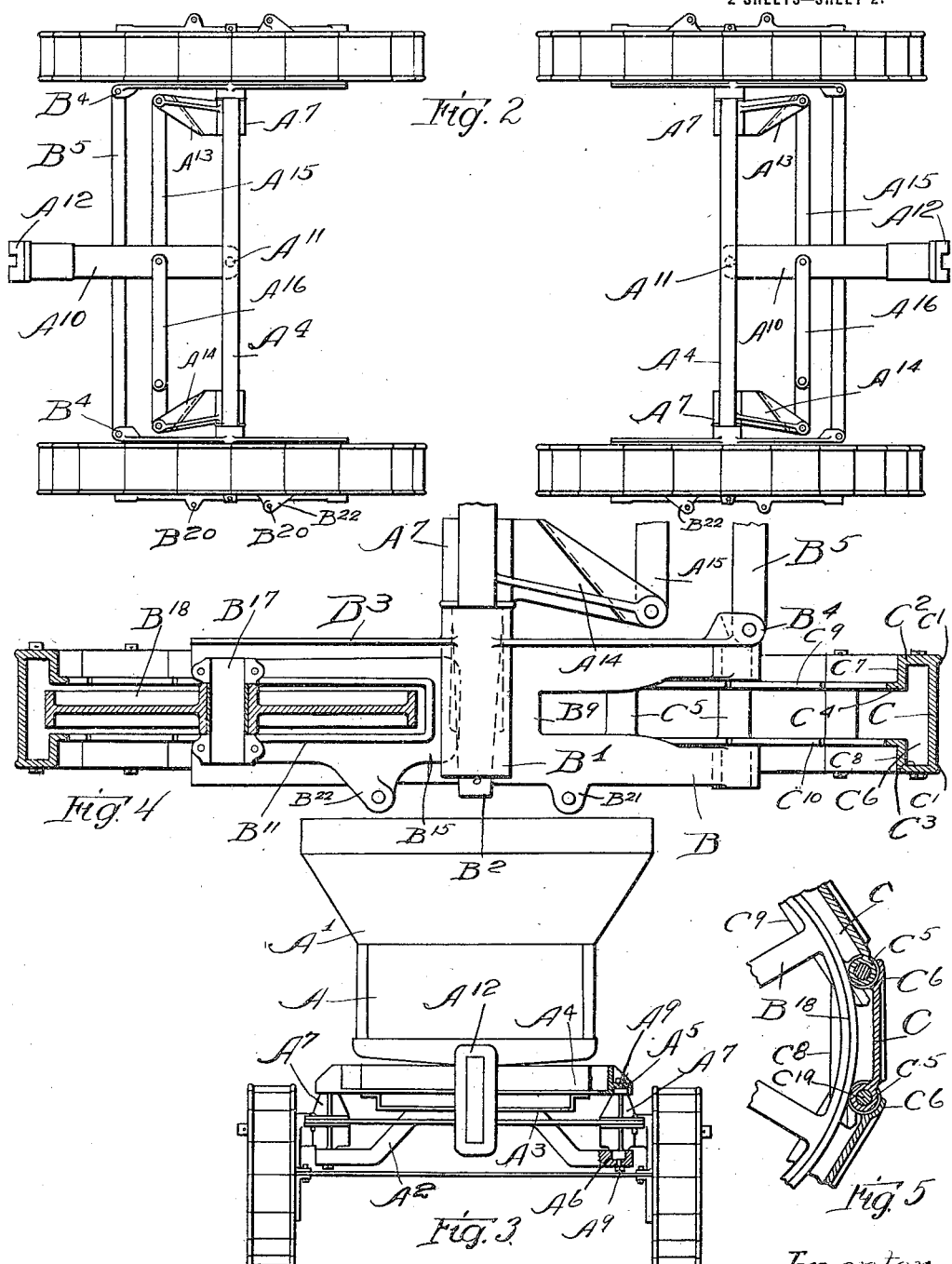

UNITED STATES PATENT OFFICE.

EMIL F. NORELIUS, OF PEORIA, ILLINOIS, ASSIGNOR TO HOLT MANUFACTURING COMPANY, OF PEORIA, ILLINOIS, A CORPORATION OF CALIFORNIA.

TRAILER-WAGON.

1,317,653.        Specification of Letters Patent.     Patented Sept. 30, 1919.

Application filed September 30, 1914. Serial No. 864,252.

*To all whom it may concern:*

Be it known that I, EMIL F. NORELIUS, a citizen of the United States, residing at Peoria, in the county of Peoria and State of Illinois, have invented a certain new and useful Improvement in Trailer-Wagons, of which the following is a specification.

There are in existence at the present time a number of trailer wagons adapted for use in connection with power propelled wagons. These wagons are arranged to follow one after the other and with small and a limited number of wagons are controlled and guided with comparative ease. However, it becomes desirable in such wagon trains to support very heavy loads in unit wagons since too small unit weight results in too long a train which becomes very unwieldy. However, when the weights carrying the individual wagons arrive at a certain point the difficulty in handling the wagon becomes greater because of the harm done to the roadway and because of the sinking in of the wagon wheels. I propose to obviate this difficulty by providing endless, flexible, self-laying track members for the individual wagon whereby the surfaces in contact with the ground may be increased and the pressure per square inch may be reduced to a minimum.

One important object of this invention is to provide an interchangeable self-laying track attachment for ordinary wagons, whereby, when desired, the usual round wheels may be taken off the wagon and the self-laying track attachment applied without any change being made in the vehicle.

Another important feature in the present instance is the particular track construction comprising a truck frame designed to oscillate about the center, as for example the ordinary axle of a round wheel vehicle, with idlers mounted on the truck frame on adjustable bell cranks for effecting the adjustment of the self-laying track which passes around the idlers.

This special rocking truck construction is not limited to wagons or vehicles which are not self-propelled, as it may be applicable to tractors.

My invention, therefore, relates to improvements in trailer wagons and is illustrated more or less diagrammatically in one form in the accompanying drawings, wherein—

Figure 1 is a side elevation;
Fig. 2 is a plan view;
Fig. 3 is an end elevation in part section;
Fig. 4 is a detailed plan view in part section of the steering mechanism;
Fig. 5 is a detailed vertical section through the chain;
Fig. 6 is a section on the line 6—6 of Fig. 1;
Fig. 7 is a section on the line 7—7 of Fig. 1;
Fig. 8 is a detailed side view of the adjusting mechanism for the chain.

Like parts are indicated by like letters throughout the several figures.

A is a wagon frame having the usual type of hopper body $A^1$. This wagon frame is supported at either end upon a built-up axle made up of the inverted channel bar $A^2$ connected at its center to a yoke $A^3$ which downwardly depends from a rigid axle casting $A^4$. The two ends of the channel bar $A^2$ and the two ends of the rigid axle casting $A^4$ are recessed as at $A^5$, $A^6$ to furnish a support and bearing for the ends of the vertical rotatable spindle $A^7$ which spindle is held in position by the cap screws $A^9$. $A^{10}$ is a draw bar pivoted on the axle $A^4$. $A^{11}$ is a holding bolt which ties the end of the draw bar, axle $A^{11}$ and yoke $A^3$ all together. $A^{12}$ is the usual well-known type of coupler head mounted on the end of the draw bar $A^{10}$. $A^{13}$, $A^{14}$ are steering arms projecting forwardly from the two knuckles or spindles $A^7$ and these arms are tied together by the cross tie rod $A^{15}$ pivoted to the free ends of said arms. $A^{16}$ is a link pivoted at one end on the draw bar $A^{10}$ and at the other end on the tie rod $A^{15}$.

B is a truck frame. This frame has at its upper extremity a hub $B^1$ which is pivotally mounted on a horizontal spindle $B^2$ which projects outwardly from the spindle or knuckle $A^7$. Downwardly depending from the inner end of this hub $B^1$ is a flange $B^3$. This flange $B^3$ has at one end the jaw $B^4$ in which is adapted to be mounted the end of the tie rod $D^5$. $B^6$, $B^7$ are roller carrying yokes or brackets integral with the frame B being tied thereto by the flange $B^8$ which downwardly depends from the hub $B^1$ and by the flange $B^9$ which extends outwardly from the frame B. $B^{11}$, $B^{12}$ are wheel carrying yokes having at either side downwardly depending arms $B^{13}$ which are pivoted at $B^{14}$ to the ends of the frame B. These yokes are substantially U-shaped with reinforcing flanges $B^{15}$ and form at their upper corners the bearings $B^{16}$ in which are rotatably mounted axles $B^{17}$. Supporting wheels $B^{18}$ are rotatably mounted on axles $B^{17}$. $B^{20}$ are adjusting set-screws in engagement with lugs $B^{21}$ on the frame B having ends in engagement with bosses $B^{22}$ in yokes $B^{11}$, $B^{12}$ whereby the yokes may be rotated with respect to the frame to change the position of the axles $B^{17}$. $B^{23}$ are rollers mounted both on the frames $B^6$ and $B^7$. The endless, flexible, self-laying track along which the wheels and rollers travel and which is picked up and laid down as the vehicle progresses is made up of a series of box-links, exactly similar each to the other and, therefore, the description of one of them will suffice for all.

C is a substantially flat tread surface having on either side a flange $C^1$. $C^2$, $C^3$ are side walls inwardly bent at one end as at $C^4$. $C^5$ is a bearing sleeve held within the aperture $C^6$ in the inwardly offset walls $C^2$, $C^3$. $C^7$, $C^8$ are track walls or surfaces parallel with the surface C and extending inwardly from the side walls $C^2$, $C^3$ and terminating in the upwardly extending flanges $C^9$, $C^{10}$ leaving an aperture therebetween into the interior of the box. A tie pin 19 passes through the walls $C^2$, $C^3$ and through the bearing sleeve, being held in place by known or preferred means.

It will be evident that while I have shown in my drawings an operative device, still many changes might be made both in size, shape and arrangement of parts without departing materially from the spirit of my invention and I wish, therefore, that my drawings be regarded as in a sense diagrammatic.

The use and operation of my invention are as follows:—

When it is desired to substitute for the well-known type of wagon wheel mounted on the usual type of axle my flexible self-laying track running gear, it is only necessary to remove the wheels and support or mount on each axle or spindle one of my track members. These members may then be tied together in any suitable way, although this is not essential as they do not normally operate in a plane perpendicular to the axle spindle so that the tying together of the members can be dispensed with if necessary. However, in any event it is only necessary to remove the rotary wagon wheel and put in place the spindle thus leaving my device without any change in arrangement or operation of the wagon whereupon the wagon is then the self-laying track running gear instead of the wagon and the gear itself is, of course, then pivoted on the same axle which originally carried the wheel. In assembly after the truck has been put in place the lower tie rods are then inserted in position to hold the track frame in parallelism and the vehicle is ready to move. When it is thus moved the track chain rotates around the wheels being fed down and picked up forming as it travels a substantially smooth track over which the rollers may pass.

The large idler wheels penetrate into the interior of the box links and engaging bearing sleeves in these links assist in guiding the chain and also in carrying a certain portion of the load. The rollers arranged in two sets of two each both on the outside and inside of each frame ride along the back walls of the box links and since these back walls are merely parts of hinged rectilinear links they have each a portion of a lever track along which the rollers are free to travel with smoothness and ease, carrying most of the load. As the chain wears their length will increase and it becomes necessary to provide means for tightening the chains. These means are found in the bell crank effect on the wheel yoke. The rotation of these yokes caused by screwing up the cap screws shown in the drawing will cause the wheel axle $B^{17}$ to be rotated forwardly and rearwardly to separate them thus increasing the tension on the chain owing to the separation of the centers or axles $B^{17}$.

The weight supported by the vehicle is thus carried to a major extent at least on four small rollers and these four small rollers are located adjacent the outer edges or side walls of the links thus the danger of tipping or distortion of the links or chains owing to stones or other rigid articles being found under one side on the link is to a large extent obviated. The boxes are very shallow and therefore it is necessary for strength and stiffness that the front be disproportionately large and thus there is not room for an over hanging flange on the roller and for this reason the link is put on the roller itself.

It will be noted that the drawbars are so coupled with the track-laying supporting trucks that the latter will be turned on their vertical axes or steering knuckles in such wise that the trucks will assume the proper angle necessary in describing a curve or arc; or, in other words, they will track properly, so as to follow the curvature of the roadway substantially as would be the case if they were running on fixed rails. The arrangement of the steering knuckles and transverse connecting links between the steering arms and truck frames will hold the truck frames parallel with each other in traveling a straight course, but that parallelism is gradually altered in turning a curve so that the truck frame on the inner side of the curve is at a sharper angle than is the truck frame on the outer side of the curve, with the result that a minimum resistance is offered to the forward movement of the trailer, and each truck frame is at a proper angle with relation to the longitudinal center of the body to described an arc of the required radius,—a result which is believed to be new in connection with track-laying supporting trucks, and a result which materially lessens the objections heretofore urged against this type of trailer wagon.

I claim:

1. A running gear for wagons comprising a plurality of pairs of endless, flexible, self-laying track chain members pivoted on horizontal axes to oscillate in vertical planes independently of each other and pivoted on vertical axes to turn laterally for steering, with means independent of their pivotal supports for holding the trucks of each pair in parallelism when traveling a straight course and for causing them to assume an angular relation to each other in traveling a curved course.

2. A running gear for wagons comprising a plurality of pairs of endless, flexible, self-laying track-chain members pivotally mounted on horizontal axes to oscillate vertically independently of each other, and pivotally mounted on vertical axes to turn laterally for steering, and transverse connections between the trucks of each pair independent of their pivotal supports, whereby they are forced to turn laterally in unison but to different angular positions and are normally held in parallelism when traveling in a straight course.

3. A running gear for trailer wagons comprising pairs of substantially parallel tracklaying supporting trucks, pivotally mounted on vertical axes for movement in a horizontal plane, drawbars for coupling the wagons in a train one to the other, transverse connections between the trucks of each pair independent of their pivotal supports and positioned for causing the same to turn in unison in a horizontal plane to relatively different angular positions, and connections intermediate said trucks and drawbars for controlling the turning of said trucks.

4. A running gear for trailer wagons comprising track-laying supporting trucks arranged in pairs and pivotally mounted for movement in both vertical and horizontal planes, and means independent of their pivotal supports for maintaining the trucks of each pair in substantially parallel vertical planes to travel a straight course and to move them into non-parallel planes to travel a curved course.

5. An endless, flexible, self-laying track member for vehicles and the like comprising a frame, guide wheels located at either end thereof, rollers located thereon on either side thereof, an endless, flexible, self-laying track chain riding upon said wheels and supporting said rollers and means for displacing the axes of the wheels with respect to the wheel to tighten the chain, said means comprising a bell-crank yoke pivoted at one end on the frame, bearings for the rollers located at their fulcrum and adjustable means intermediate the other end of the frame to rock the yoke about its pivotal point.

6. An endless, flexible, self-laying track member for vehicles and the like comprising a frame, guide wheels located at either end thereof, rollers located thereon on either side thereof, an endless, flexible, self-laying track chain riding upon said wheels and supporting said rollers and means for displacing the axes of the wheels with respect to the wheel to tighten the chain, said means comprising a bell-crank yoke pivoted at one end of the frame, bearings for the rollers located at their fulcrum and adjustable means intermediate the other end of the frame to rock the yoke about its pivotal point and guiding flanges on the track chain to engage said wheels and said rollers.

7. An endless, flexible, self-laying track member for vehicles and the like comprising a frame, guide wheels located at either end thereof, rollers located thereon on either side thereof, an endless, flexible, self-laying track chain riding upon said wheels and supporting said rollers and means for displacing the axes of the wheels with respect to the wheel to tighten the chain, said means comprising a bell-crank yoke pivoted at one end of the frame, bearings for the rollers located at their fulcrum and adjustable means intermediate the other end of the frame to rock the yoke about its pivotal point and guiding flanges on the track chain to engage said wheels and said rollers, said wheels and said rollers all resting upon and supported by the track chain but being in contact with it on different levels.

8. An endless, flexible, self-laying track member for vehicles and the like comprising a frame, guide wheels located at either end thereof, rollers located thereon on either side thereof, an endless, flexible, self-laying track chain riding upon said wheels and supporting said rollers and means for displacing the axes of the wheels with respect to the wheel to tighten the chain, said means comprising a bell-crank yoke pivoted at one end of the frame, bearings for the rollers located at their fulcrum and adjustable means intermediate the other end of the frame to rock the yoke about its pivotal point and guiding flanges on the track chain to engage said wheels and said rollers, said wheels and said rollers all resting upon and supported by the track chain but being in contact with it on different levels, the rollers being in engagement with the outside edges of the track chain.

9. An endless, flexible, self-laying track member for vehicles and the like, comprising a frame, guide wheels located at either end thereof, rollers located thereon on either side thereof, an endless, flexible, self-laying track chain riding upon said wheels and supporting said rollers and means for displacing the axes of the wheels with respect to the wheel to tighten the chain, said means comprising a bell-crank yoke pivoted at one end of the frame, bearings for the rollers located at their fulcrum to rock the yoke about its pivotal point and guiding flanges on the track chain to engage said wheels and said rollers, said wheels and said rollers all resting upon and supported by the track chain but being in contact with it in different levels, the rollers being in engagement with the outside edges of the track chain, the wheels being in engagement with the central portion thereof.

10. An endless, flexible, self-laying track member for vehicles and the like comprising a frame, guide wheels located at either end thereof, rollers located thereon on either side thereof, an endless, flexible, self-laying track chain riding upon said wheels and supporting said rollers and means for displacing the axes of the wheels with respect to the wheel to tighten the chain, said means comprising a bell-crank yoke pivoted at one end to the frame, bearings for the rollers located at their fulcrum and adjustable means intermediate the other end of the frame to rock the yoke about its pivotal point and guiding flanges on the track chain to engage said wheels and said rollers, said wheels and said rollers all resting upon and supported by the track chain but being in contact with it on different levels, the rollers being in engagement with the outside edges of the track chain, the wheels being in engagement with the central portion thereof and a guide flange on the chain interposed between the wheels and rollers.

11. A running gear for wagons comprising a plurality of pairs of endless flexible self-laying track members pivotally mounted to move in both horizontal and vertical planes, means remote from and independent of their pivotal supports for holding the trucks of each pair in substantially parallel vertical planes, said members being free to oscillate independently of each other in their respective planes, and means for turning said members horizontally into non-parallel planes for steering a curved course.

In testimony whereof, I affix my signature in the presence of two witnesses this 21st day of Sept., 1914.

EMIL F. NORELIUS.

Witnesses:
ROBERT W. GOTSHALL,
WILLIAM TURNHILL.